United States Patent
Yochum

(10) Patent No.: US 9,611,051 B2
(45) Date of Patent: Apr. 4, 2017

(54) AIRCRAFT POSITION DISPLAY SYSTEM

(71) Applicant: The Boeing Company, Chicago, IL (US)

(72) Inventor: Thomas Edward Yochum, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 291 days.

(21) Appl. No.: 14/468,816

(22) Filed: Aug. 26, 2014

(65) Prior Publication Data

US 2016/0297540 A1    Oct. 13, 2016

(51) Int. Cl.
| | |
|---|---|
| *G01C 21/00* | (2006.01) |
| *G01C 23/00* | (2006.01) |
| *B64D 43/00* | (2006.01) |
| *G08G 5/00* | (2006.01) |
| *G01C 21/16* | (2006.01) |

(52) U.S. Cl.
CPC .......... *B64D 43/00* (2013.01); *G01C 21/165* (2013.01); *G01C 23/00* (2013.01); *G08G 5/0021* (2013.01)

(58) Field of Classification Search
CPC .... G01C 23/00; G01C 21/165; G08G 5/0021; B64D 43/00
USPC ...................... 340/971, 945, 979; 701/1, 454
See application file for complete search history.

(56) References Cited

U.S. PATENT DOCUMENTS

| | | |
|---|---|---|
| 5,936,552 A | 8/1999 | Wichgers et al. |
| 7,782,229 B1 | 8/2010 | Barber |
| 8,027,756 B2 * | 9/2011 | Davis .................... G01C 21/00 701/14 |
| 8,514,102 B2 | 8/2013 | Palanisamy et al. |
| 2004/0189492 A1 | 9/2004 | Selk et al. |

FOREIGN PATENT DOCUMENTS

EP    2345872 A2    7/2011

OTHER PUBLICATIONS

Extended European Search Report, dated Jan. 19, 2016, regarding Application No. EP15182465.3, 9 pages.

* cited by examiner

*Primary Examiner* — John A Tweel, Jr.
(74) *Attorney, Agent, or Firm* — Yee & Associates, P.C.

(57) ABSTRACT

A method for managing navigation of an aircraft. Positions for the aircraft are identified from position information from sensors. Graphical indicators are displayed on a graphical user interface in a display system. The graphical indicators identify the positions for the aircraft. Range rings are displayed around the graphical indicators. The range rings indicate accuracy bounds for the positions.

20 Claims, 7 Drawing Sheets

AIRCRAFT POSITION DISPLAY SYSTEM

BACKGROUND INFORMATION

1. Field

The present disclosure relates generally to aircraft and, in particular, to operating aircraft. Still more particularly, the present disclosure relates to a method and apparatus for displaying positions of an aircraft from positioning systems for the aircraft.

2. Background

In an aircraft, a flight management system provides assistance with a number of different in-flight tasks. As a result, workload and flight crew may be reduced. For example, a flight management system manages the flight plan during flight of the aircraft. The flight management system receives position information input from different sensors to identify the position of the aircraft. With the position of the aircraft, the flight management system may guide the aircraft along the flight plan. The information managed by the flight management system may be displayed on control display unit (CDU), a multifunction display (MFD), a navigation display (ND), or other display devices for the flight management system.

One function of the flight management system is to identify a position of the aircraft and the accuracy of the position identified for the aircraft. A flight management system often uses many sensors to identify the position of the aircraft. For example, a localizer receiver, a global positioning system receiver, a VHF omnidirectional range (VOR) device, distance measuring equipment (DME), an inertial reference system (IRS), and other suitable devices may be used. This position may be used to manage the navigation of the aircraft along the route identified in the flight plan.

Each of the sensors provides information about the position of the aircraft. The flight management system combines the positions from the sensors to identify the position of the aircraft. This position may be referred to as a system position for the aircraft as generated by the flight management system from the positions indicated by the different sensors.

In some instances, one of the sensors may not identify a position of the aircraft as accurately as desired. In this situation, the pilot may analyze the information generated by the sensors to identify whether one or more of the sensors are not providing a position of the aircraft with a desired level of accuracy. When the sensors are identified as not providing a desired level of accuracy, the pilot may remove that sensor from use. As a result, the remaining sensors generating positions for the aircraft may provide a desired level of accuracy.

This process of identifying a sensor that does not provide a desired level accuracy may require more time and effort than desired. Currently, a pilot interacts with the flight management system through a control display unit. The control display unit currently shows information from sensors. For example, the pilot can configure the flight management system to display the latitude and longitude computed for the aircraft using the sensors. The information, however, is displayed as text. The text may be alphanumeric.

The pilot reads this information and performs calculations to identify which sensor is working as desired. This process may take more time and effort than desired with the other tasks that the pilot performs during operation of the aircraft. Therefore, it would be desirable to have a method and apparatus that take into account at least some of the issues discussed above, as well as other possible issues.

SUMMARY

In one illustrative embodiment, a method for managing navigation of an aircraft is presented. Positions for the aircraft are identified from position information from sensors. Graphical indicators are displayed on a graphical user interface in a display system. The graphical indicators identify the positions for the aircraft. Range rings are displayed around the graphical indicators. The range rings indicate accuracy bounds for the positions.

In another illustrative embodiment, an apparatus comprises a navigation function that identifies positions for an aircraft from position information from sensors. The navigation function also displays graphical indicators on a graphical user interface in a display system. The graphical indicators identify the positions for the aircraft. Range rings are displayed around the graphical indicators. The range rings indicate accuracy bounds for the positions.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the illustrative embodiments recognize and take into account that the currently used display systems require more effort and concentration from the pilots or other flight crew than desired. For example, with the text form of position information displayed by a control display unit, the pilot performs calculations using the information displayed to determine whether a sensor is performing as desired.

The illustrative embodiments also recognize and take into account that position information may be displayed in a form that allows for an intuitive identification of a sensor that is not performing as desired. In other words, the pilot may view the position information to more quickly determine whether a sensor is performing as desired without forming calculations from text representing the position of aircraft generated by the sensor. The text may include letters, numbers, or both.

Thus, the illustrative embodiments provide a method and apparatus for managing position information for navigating an aircraft. Positions for an aircraft are identified from position information from sensors. Graphical indicators are displayed on a graphical user interface in a display system. The graphical indicators identify the positions for the aircraft. Range rings are also displayed around the graphical indicators. The range rings indicate accuracy bounds for the positions.

Figure 1:
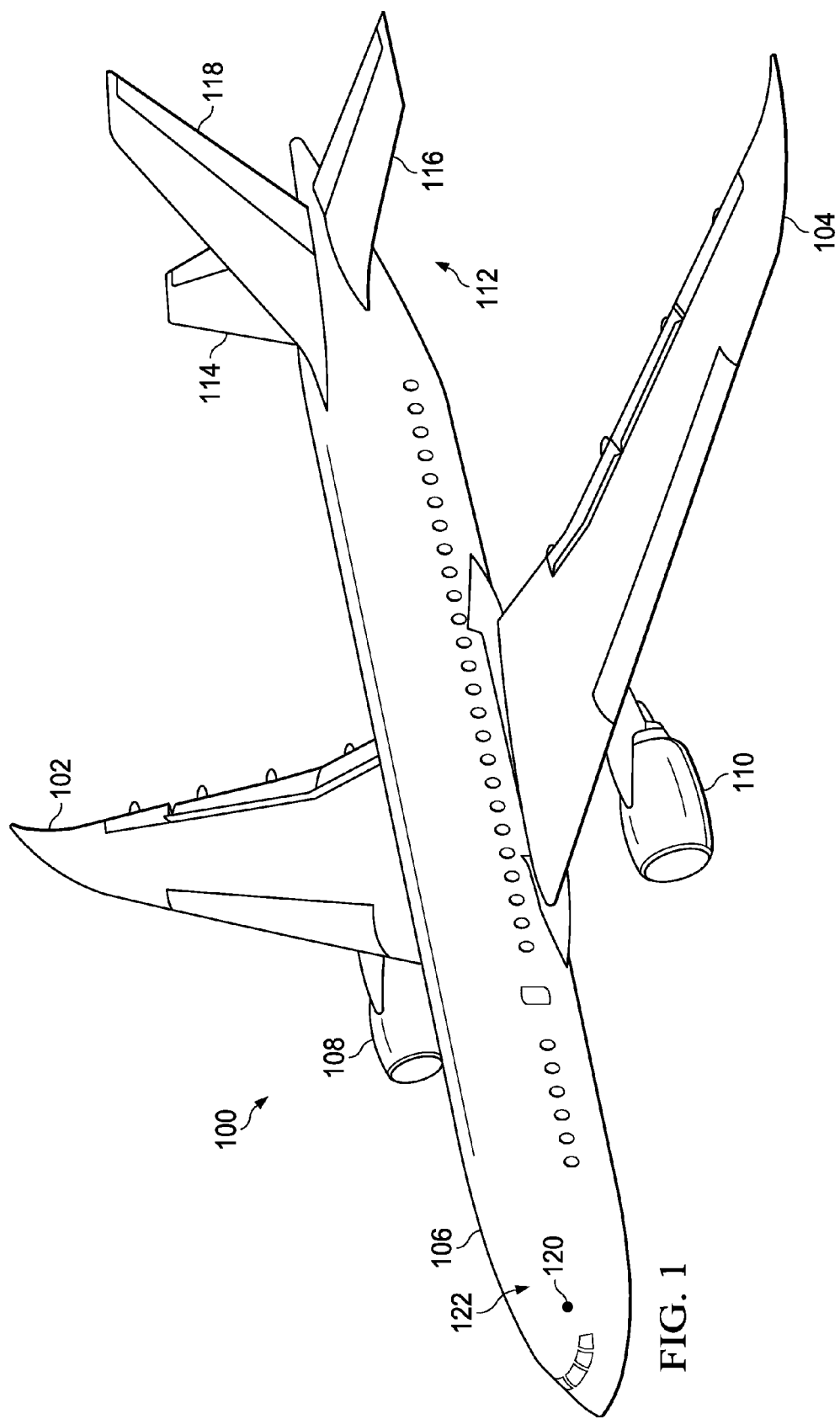
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a navigation system may be implemented in accordance with an illustrative embodiment. In particular, navigation system 120 may be implemented in cockpit 122 in aircraft 100. Navigation system 120 provides a graphical user interface that indicates positions of aircraft 100 as identified by sensors in aircraft 100. This graphical user interface provides a display of the positions of aircraft 100 in a graphical manner in contrast to currently available displays such as the display provided through a control display unit in a flight management system.

For example, the graphical user interface provided by navigation system 120 allows for a pilot or other crew members to more intuitively identify whether a sensor identifying the position of aircraft 100 is not performing as accurately as desired. With the graphical user interface, calculations typically performed by the pilot using text information may be reduced or avoided. As a result, the pilot may more quickly identify whether a particular sensor for aircraft 100 is not performing as desired. The pilot may then focus and concentrate on other tasks needed to operate aircraft 100.

Figure 2:
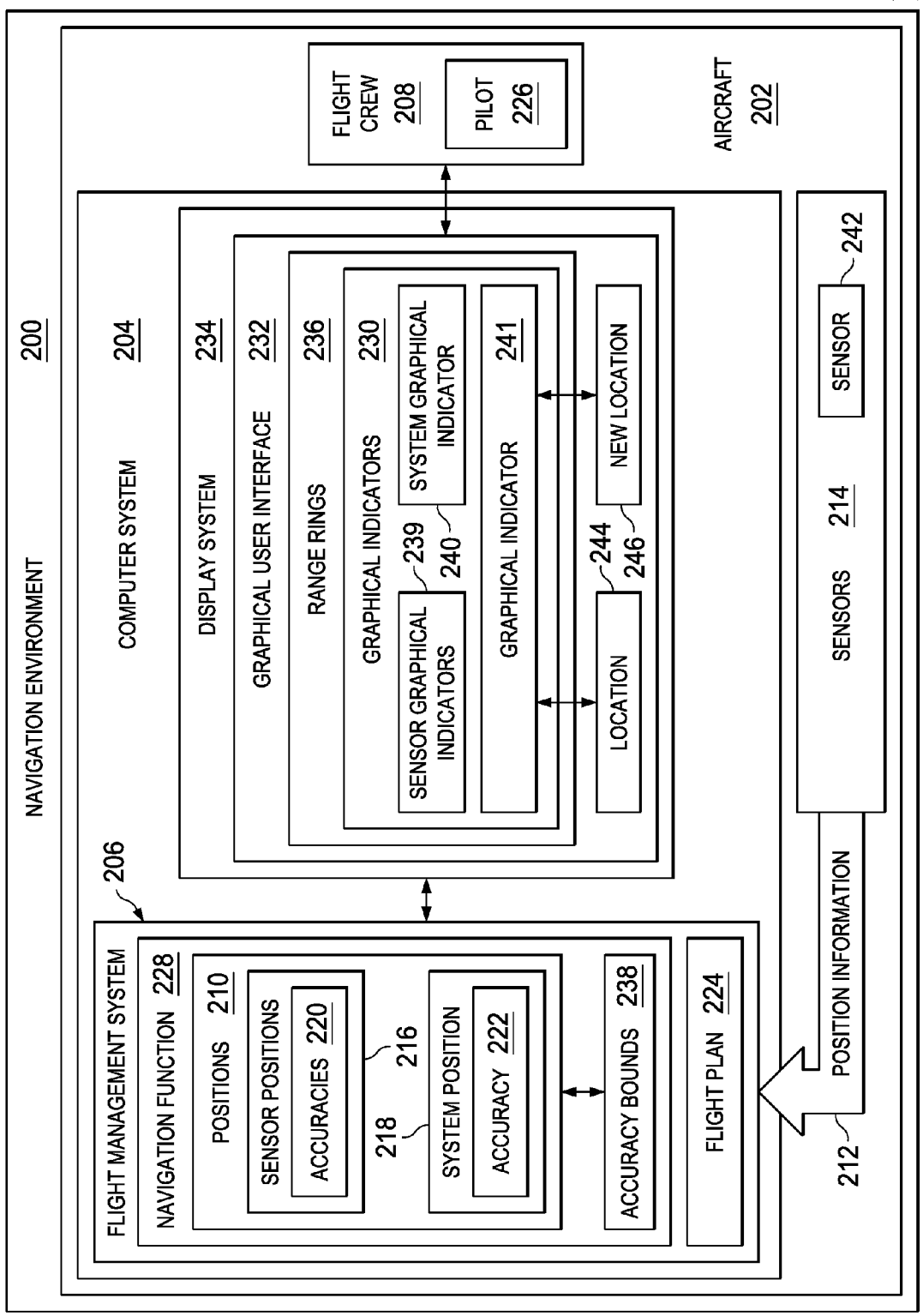
FIG. 2 is an illustration of a block diagram of a navigation environment in accordance with an illustrative embodiment.

With reference next to FIG. 2, an illustration of a block diagram of a navigation environment is depicted in accordance with an illustrative embodiment. In this illustrative example, navigation environment 200 includes aircraft 202. As depicted, aircraft 202, shown in block form in this figure, may be implemented using aircraft 100 in FIG. 1, which is a commercial airplane.

As illustrated, aircraft 202 includes computer system 204. Computer system 204 is comprised of one or more data processing systems. When more than one data processing system is present, those data processing systems may be in communication with each other using a communications medium. The communications medium may be a network. The data processing systems may be selected from at least one of a computer, a server computer, a tablet, an electronic flight bag, a mobile phone, or some other suitable data processing system.

As depicted, computer system 204 performs different functions when operating aircraft 202. For example, computer system 204 may include flight management system 206. As depicted, flight management system 206 performs different in-flight tasks to reduce the workload of flight crew 208.

In the illustrative example, navigation function 228, located inside of flight management system 206, identifies positions 210 from position information 212 received from sensors 214. As depicted, a position in positions 210 is a position of the aircraft as indicated by a single sensor in sensors 214.

In the illustrative example, position information 212 is generated by sensors 214. Position information 212 includes a description of the position of sensors 214 as identified by sensors 214. For example, a position of a sensor in sensors 214 may be described using coordinates. In this example, the coordinates may be in terms of longitude and latitude for the position of aircraft 202. In some illustrative examples, the coordinates may also include altitude.

In these illustrative examples, positions 210 include sensor positions 216 and may include positions from sources other than sensors 214. For example, positions 210 also includes system position 218. As depicted, system position 218 is a position of aircraft 202.

Sensors 214 may take different forms. For example, sensors 214 may be selected from at least one of an inertial navigation unit, a global navigation satellite system receiver, a localizer receiver, a VHF omnidirectional radio range unit, or a distance measuring equipment unit.

In this illustrative example, navigation function 228 identifies system position 218 from sensor positions 216. In this example, system position 218 is identified indirectly from sensor positions 216. In particular, system position 218 is an estimate of the position of the aircraft using sensor positions 216 as inputs. In the illustrative example, system position 218 is based on sensor positions 216 and may also be based on accuracies 220 for sensor positions 216.

For example, system position 218 may be a blend of positions 210. This blending or combination may be performed using various techniques for identifying a best solution. For example, a complementary filter, a Kalman filter, or some other technique may be used to estimate position information 212 from sensors 214 to identify system position 218.

In this illustrative example, accuracy 222 for system position 218 depends on accuracies 220 of positions 210 as identified in position information 212 received from sensors 214. System position 218 is used by flight management system 206 to manage flight plan 224 for aircraft 202. If accuracy 222 for system position 218 is not as great as desired, the flight crew 208 may have to abandon the current flight plan 224.

As depicted, pilot 226 in flight crew 208 may analyze position information 212 from sensors 214 to determine whether any of sensors 214 are not operating as desired. For example, a sensor position in sensor positions 216 may be far off enough from the other sensor positions that the sensor is not operating as desired. In the illustrative example, this analysis may be performed without requiring pilot 226 to perform calculations from the text format of position information 212.

As depicted, navigation function 228 identifies positions 210 for aircraft 202 from position information 212 from sensors 214. Graphical indicators 230 are displayed on graphical user interface 232 in display system 234. AS illustrated, display system 234 is located in at least one of flight management system 206 or an electronic flight bag.

In this depicted example, display system 234 includes one or more hardware devices that display information in aircraft 202. These hardware devices may be selected from at least one of a liquid crystal display, a light emitting diode display, a touchscreen device, or other suitable devices.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In this illustrative example, graphical indicators 230 identify positions 210 for aircraft 202. As depicted, each graphical indicator represents an output from a single sensor. For example, a display of 10 graphical indicators indicates positions 210 for 10 sensors.

Range rings 236 are displayed around graphical indicators 230. As depicted, range rings 236 indicate accuracy bounds 238 for positions 210. In particular, range rings 236 may indicate accuracy bounds 238 for sensor positions 216. An accuracy bounds 238 indicates the likelihood that the position indicated by a sensor is within the area defined by an accuracy bound. A range ring is a type of graphical indicator to visually show the accuracy bound. For example, a 95 percent certainty may be present for a likelihood of aircraft 202 being within the area within a range ring in range rings 236.

In the illustrative example, accuracy bounds 238 may be determined in a number of different ways, depending on the type of sensor used. For example, an inertial navigation system increases in error over time. An accuracy bound for an inertial navigation sensor may be identified using a function based on time. Thus, the range ring may grow over time.

As another example, a radio based navigation aid has accuracy bound based on assumed error characteristics of the signal and the positions of the sensor. As yet another example, a global position receiver reports its accuracy. That reported accuracy is used to identify the accuracy bounds 238 for the global positioning system receiver. In this manner, a range ring in range rings 236 visually indicates an area in which a sensor in sensors 214 may be located with a selected level of certainty.

As depicted, the radius of a range ring in range rings 236 is selected such that the area within the range ring has the level of certainty that the true aircraft position is present in the area for an accuracy bound that is visually represented by the range ring. For example, the area in a range ring in range rings 236 represents a 95 percent certainty that the true aircraft position is within the area defined by the range ring displayed for the sensor. The true aircraft position is the actual position of the aircraft.

In the illustrative example, as a range ring increases in radius, the accuracy of the sensor decreases. Also, the radius of a range ring may change over time as the factors that impact the accuracy of the sensor change.

In the illustrative example, the range ring may be used by the pilot to intuitively determine that the estimated position of the aircraft provided by a sensor is not correct. The sensor may not function as desired, the processing of the sensor information may be in error, or some other condition may be present that results in the range ring indicating an issue with the output of the sensor.

In the illustrative example, graphical indicators 230 and range rings 236 may be used by pilot 226 to determine whether position information 212 generated by sensors 214 has a desired level of accuracy in identifying positions 210 for aircraft 202. Pilot 226 may perform this determination based on viewing graphical indicators 230 and range rings 236 without needing to form calculations based on values in position information 212.

As depicted, graphical indicators 230 includes sensor graphical indicators 239 and system graphical indicator 240. Sensor graphical indicators 239 show sensor positions 216 in positions 210 on graphical user interface 232. System graphical indicator 240 shows system position 218 in positions 210 on graphical user interface 232. As illustrated, system graphical indicator 240 in graphical indicators 230 indicates a position of aircraft 202 based on positions 210 indicated by graphical indicators 230 for sensors 214.

With graphical indicators 230 and range rings 236 in graphical user interface 232, pilot 226 may view graphical user interface 232 to visually see whether a particular sensor position in sensor positions 216 is far off enough to be considered unreliable. This determination may be made by viewing graphical indicators 230 in combination with range rings 236 in one illustrative example.

As depicted, the sensor position generated by the sensor may be removed from consideration by flight management system 206 when identifying system position 218. In this manner, system position 218 may have increased accuracy as compared to when the particular sensor is used to identify system position 218. Further, pilot 226 may identify when a sensor in sensors 214 may not provide position information 212 with a desired level of accuracy more quickly and with less effort.

In one illustrative example, graphical indicators 230 are displayed on graphical user interface 232 using a touchscreen device in display system 234. In this manner, pilot 226 may interact with graphical user interface 232 and enter user input through the touchscreen device.

For example, user input may be received at the touchscreen device with pilot 226 using one or more fingers to enter the user input through gestures. As another example, the pilot may use a stylus or other input device to enter user input through the touchscreen device.

In the illustrative example, the display of graphical indicator 241 in graphical indicators 230 on graphical user interface 232 in display system 234 may be changed based on the user input. This change may take various forms. For example, graphical indicator 241 may be removed from graphical user interface 232. The removal of graphical user interface 232 may result in disabling sensor 242 originating position information 212 for graphical indicator 241. In other words, the portion of position information 212 from sensor 242 is no longer used in identifying positions 210.

In another illustrative example, the change involves shifting location 244 of graphical indicator 241 to new location 246 in graphical user interface 232. In some illustrative examples, graphical indicator 241 may be system graphical indicator 240.

In this illustrative example, the shifting of system graphical indicator 240 causes a recalculation of system position 218 using position information 212 from the remaining sensors 214. The position of system graphical indicator 240 is a starting location for performing the new calculation of system position 218 in this illustrative example.

In this manner, pilot 226 may use graphical user interface 232 for troubleshooting a navigation error caused by one or more of sensors 214. Pilot 226 may identify a sensor that is not operating as desired more quickly using graphical user interface 232 as compared to performing calculations and analysis using text information about positions 210.

The illustration of navigation environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, aircraft 202 may take other forms other than a commercial airplane. In other illustrative examples, aircraft 202 may be a rotorcraft, an unmanned aerial vehicle (UAV), a tanker, a fighter, or some other suitable type of aircraft. Further, an illustrative embodiment may be implemented in other vehicles other than aircraft 202. For example, the illustrative embodiments may be implemented in a spacecraft, a ship, a ground vehicle, or other suitable vehicle. With the example of the unmanned aerial vehicle, the graphical user interface displayed by a navigation system may be located remotely from the unmanned aerial vehicle. For example, a graphical user interface may be in a operation center, another aircraft, a ground station, a ship, or some other suitable location.

As another example, other types of devices may be used other than a touchscreen device. For example, graphical user interface 232 may be displayed on a light emitting diode display in display system 234. User input may be received from another input device separate from a light emitting diode display. For example, a mouse, a touchpad, a keyboard, or other suitable device may be used to receive user input for interacting with graphical user interface 232.

In another illustrative example, another flight management system may be used in addition to flight management system 206. The position identified by the flight management system may be displayed in graphical user interface 232 as another system graphical indicator in addition to system graphical indicator 240.

Figure 3:
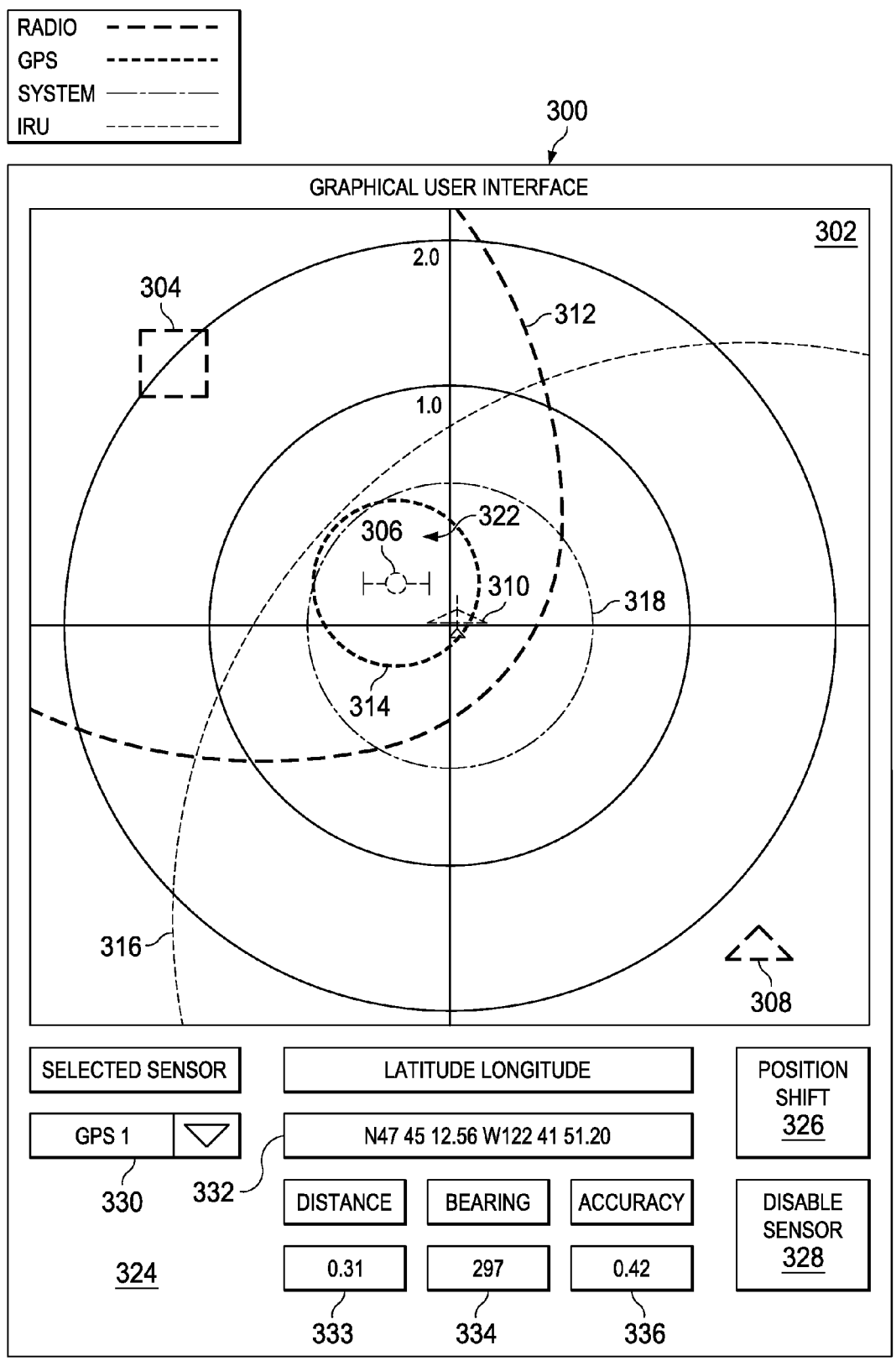
FIG. 3 is an illustration of a graphical user interface for troubleshooting a navigation error caused by a sensor in accordance with an illustrative embodiment.

Turning now to FIG. 3, an illustration of a graphical user interface for troubleshooting a navigation error caused by a sensor is depicted in accordance with an illustrative embodiment. In this illustrative example, graphical user interface 300 is an example of one implementation of graphical user interface 232 shown in block form in FIG. 2.

As depicted, graphical indicators with range rings are shown in section 302 of graphical user interface 300. In particular, graphical indicator 304, graphical indicator 306, graphical indicator 308, and graphical indicator 310 are displayed in section 302 of graphical user interface 300. In this illustrative example, range ring 312 is displayed for graphical indicator 304; range ring 314 is displayed for graphical indicator 306; range ring 316 is displayed for graphical indicator 308; and range ring 318 is displayed for graphical indicator 310.

In this illustrative example, the different graphical indicators take the form of icons that may provide an indication of the type of sensor being used. In the illustrative examples, the icons are made merely to differentiate one sensor from another sensor. Further, the different range rings are shown using lines taking different forms. For example, dashes, dots, dash dots, or other types of lines may be used. As depicted, the range rings are centered upon the different graphical indicators in this illustrative example.

As depicted, graphical indicator 304, graphical indicator 306, and graphical indicator 308 indicate positions as identified by sensors for the aircraft. These indicators are sensor indicators in this example. As depicted, graphical indicator 304 is a position identified by a radio system. This radio system may include at least one of a VHF omnidirectional range (VOR) device or distance measuring equipment (DME). Graphical indicator 306 is a position identified by a global navigation satellite system receiver, and graphical indicator 308 is a position identified by an internal reference unit.

Graphical indicator 310 is a position generated from the positions identified by the sensors. Graphical indicator 310 is a system graphical indicator that takes into account the positions identified by the sensors. For example, graphical indicator 310 indicates a position of aircraft that may be a blend of the positions indicated by graphical indicator 304, graphical indicator 306, and graphical indicator 308. The blending or combination may be made using any suitable technique such as a complementary filter, a Kalman filter, or some other suitable technique.

The graphical indicators show a position for the aircraft. The range rings show possible locations for the position of the aircraft within some level of accuracy. For example, area 322 in range ring 314 is an area in which the position of the aircraft may be within with a 95 percent confidence. In other words, the true position of the aircraft may be anywhere in area 322 in range ring 314 95 percent of the time. The different range rings are scaled for about a 95 percent level of accuracy.

As depicted, the range rings for different sensors overlap graphical indicator 310, the system position graphical indicator. As a result, a pilot may view graphical user interface 300 and see that the sensors are operating as desired.

In this example, graphical user interface 300 also includes controls in section 324. Position shift button 326 and disable sensor button 328 are controls in section 324. Disable sensor button 328 may be used to disable use of the position information from a particular sensor. Position shift button 326 may be used to shift the system position of graphical indicator 310. The shift of the position causes navigation function 228 to re-initialize system position 218, shown in block form in FIG. 2, to the position indicated in field 332 for the sensor selected in field 330.

As depicted, section 324 also displays position information in the form of text. For example, field 330 identifies a sensor selected for viewing. Field 332 displays a latitude and longitude identified as the position for the aircraft as computed by the sensor selected in field 330. Field 333 shows the distance and field 334 shows the bearing from system position 218 to the position of the sensor indicated by field 332. Field 336 shows the accuracy of the position information.

Figure 4:
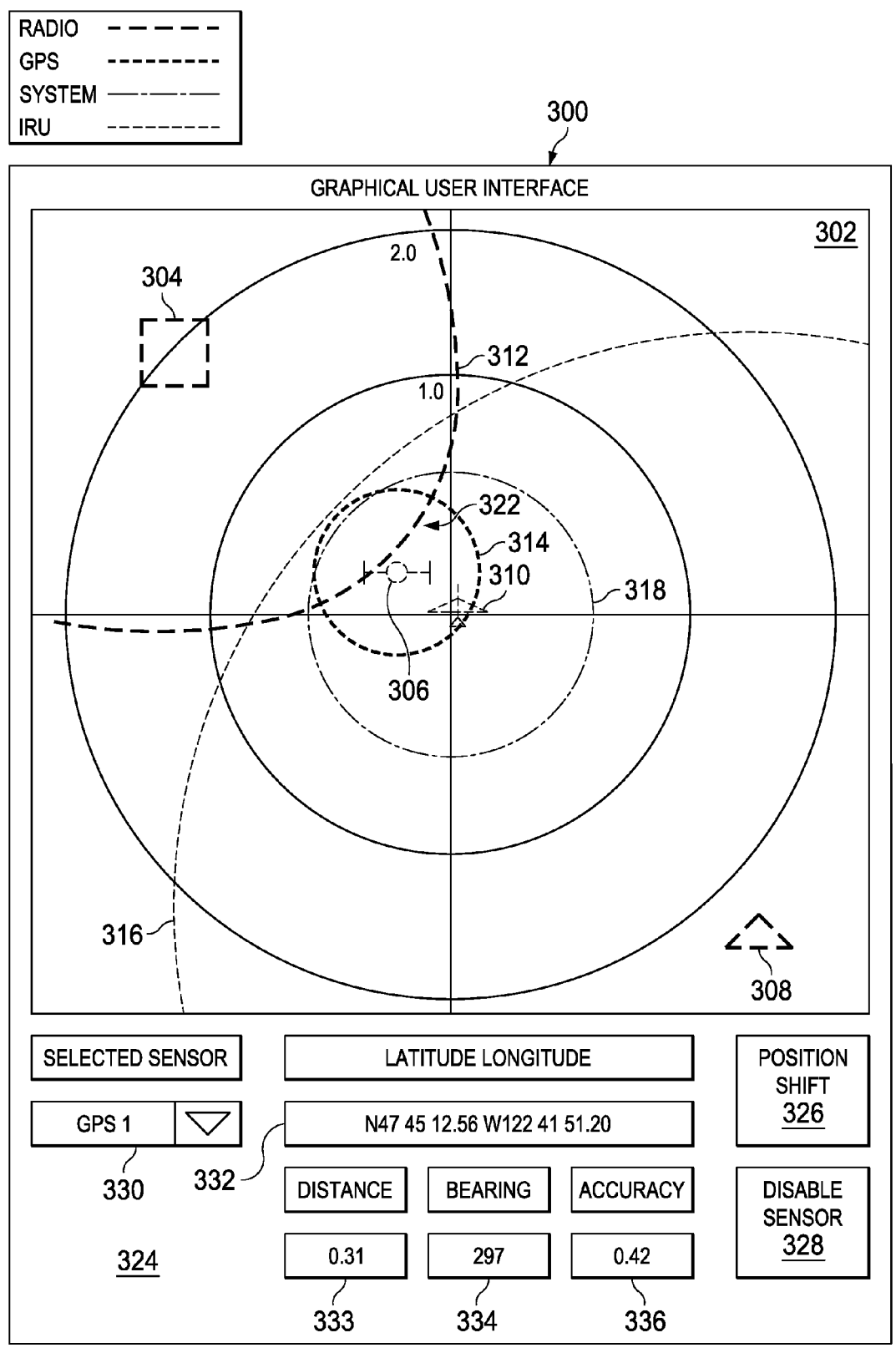
FIG. 4 is another illustration of a graphical user interface for troubleshooting a navigation error caused by a sensor in accordance with an illustrative embodiment.

With reference to FIG. 4, another illustration of a graphical user interface for troubleshooting a navigation error caused by a sensor is depicted in accordance with an illustrative embodiment. In this illustrative example, graphical indicator 304 is in a position such that range ring 312 does not overlap graphical indicator 310. In this illustrative example, graphical indicator 310 is a system graphical indicator that represents system position 218 in FIG. 2.

This absence of an overlap of range ring 312 with graphical indicator 310 for the system position may indicate that the sensor generating position information for graphical indicator 304 is not performing to its stated level of accuracy. As a result, continued use of the position information from that sensor may be undesirable. In this case, the pilot or other operator may identify the radio system, represented by graphical indicator 304, as having a lower level of accuracy than desired. The pilot may select graphical indicator 304 and then select disable sensor button 328 to disable the sensor.

In this illustrative example, the identification of the sensor not providing a desired level of accuracy is made without the pilot needing to perform calculations. Instead, the pilot views the graphical indicators and the range rings in graphical user interface 300 to more quickly see what sensor or sensors may not identify the positions of the aircraft with a desired level of accuracy.

In particular, the pilot may look to see if the range rings for the sensors overlap the system position for graphical indicator 310. An overlap of a range ring with graphical indicator 310 indicates that the position of the aircraft as indicated by graphical indicator 310 is within a level of certainty that the aircraft is within the area within a range ring.

For example, a range ring may indicate a 95 percent level of certainty that the aircraft position is somewhere within the area defined by the range ring. If graphical indicator 310 is within the range ring, then a 95 percent level of certainty is present that the aircraft position as indicated by graphical indicator 310 is correct based on the position of the aircraft as indicated by the sensor for which the range ring is displayed.

If a range ring does not overlap, the system position indicated by graphical indicator 310 is in question for the sensor for which the range ring is displayed. The sensor generating the position information for the range ring may not be operating as desired. For example, the sensor may be malfunctioning or the systems providing signals to the sensors may be providing erroneous signals. In other words, the sensor may not be providing a position estimate with the indicated level of accuracy.

The lack of a desired level of accuracy may be caused by the sensor not operating correctly, the identification of the position of the aircraft from the other positions being performed incorrectly, or some combination thereof.

Figure 5:
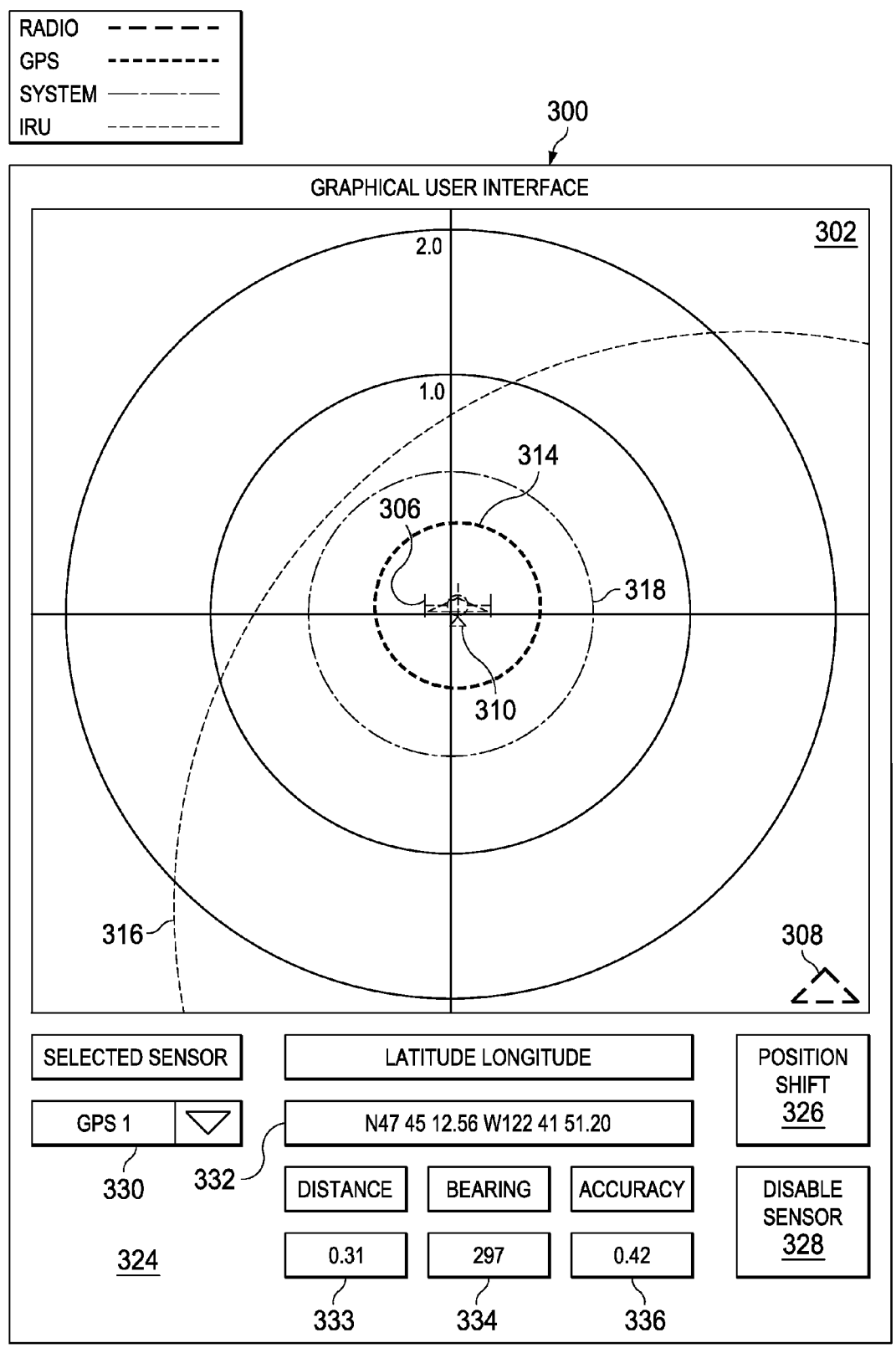
FIG. 5 is another illustration of a graphical user interface for troubleshooting a navigation error caused by a sensor in accordance with an illustrative embodiment.

With reference to FIG. 5, another illustration of a graphical user interface for troubleshooting a navigation error caused by a sensor is depicted in accordance with an illustrative embodiment. In this illustrative example, the pilot has chosen to reset system position 218 in FIG. 2 as indicated by graphical indicator 310 to the position indicated by graphical indicator 306.

In this illustrative example, the pilot may select position shift button 326 to verify that the movement of graphical indicator 310 to the new location is an intended movement and not an accidental movement of graphical indicator 310. The pilot moves graphical indicator 310 for system position 218 in FIG. 2 to the same location as graphical indicator 306. Graphical indicator 310 indicates system position 218 in FIG. 2. As depicted, graphical indicator 310 remains centered in section 302. As a result, graphical indicator 308 shifts in section 302 as shown in this figure. In this manner, graphical indicator 308 is displayed on graphical user interface 300 based on receiving a user input. In this illustrative example, graphical indicator 308 is a system graphical indicator for the position of the aircraft.

The selection of position shift button 326 and movement of graphical indicator 310 causes a recalculation of the position of the aircraft from the sensors that are still being used. Additionally, the new location for graphical indicator 310 is used as an initial position for the calculations to speed up the identification of the position of the aircraft from the other positions identified by the remaining sensors.

The illustration of graphical user interface 300 in FIGS. 3-5 is not meant to imply limitations to the manner in which graphical user interface 232 may be implemented. For example, section 324 may be omitted in other illustrative examples. In another illustrative example, other numbers of sensors may be used other than the three sensors. For example, another global positioning system receiver may be used and indicated with a graphical indicator. In yet another illustrative example, other color or other graphical features may be used in addition to or in place of the different types of lines for range rings. Also, color may be used for the graphical indicators in some illustrative examples.

In yet another illustrative example, commands for disabling a sensor, shifting a position of a sensor, and other commands may be performed using a double tap or other gesture that brings up a menu shell of the commands in place of displaying commands in section 324.

Figure 6:
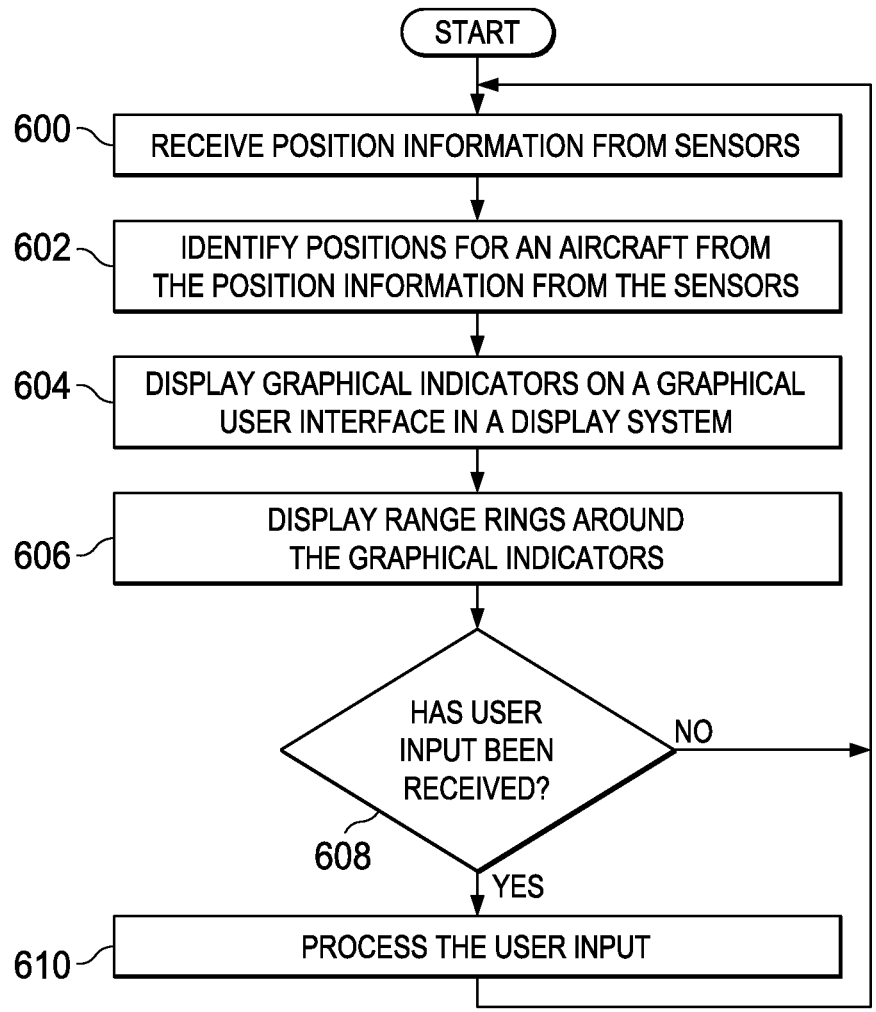
FIG. 6 is an illustration of a flowchart of a process for managing navigation of an aircraft in accordance with an illustrative embodiment.

With reference next to FIG. 6, an illustration of a flowchart of a process for managing navigation of an aircraft is depicted in accordance with an illustrative embodiment. The process in FIG. 6 may be implemented in navigation function 228 in FIG. 2.

The process begins by receiving position information from sensors (operation 600). The process then identifies positions for an aircraft from the position information from the sensors (operation 602).

The process then displays graphical indicators on a graphical user interface in a display system (operation 604). The graphical indicators in operation 604 identify the positions for the aircraft. The display of the graphical indicators on the graphical user interface may be made on a touch-screen device in the display system.

The process displays range rings around the graphical indicators (operation 606). The range rings in operation 606 indicate ranges for the positions for a particular level of accuracy. In other words, a range ring in the range rings has a radius that indicates an area in which a position of a sensor in the sensors may be found with a selected level of certainty.

A determination is made as to whether user input has been received (operation 608). If a user input has not received, the process returns to operation 600.

If a user input has been received in operation 608, the process processes the user input (operation 610) with the process then returning to operation 600. In operation 610, the user input may change a graphical indicator in the graphical indicators displayed on the graphical user interface in the display system based on the user input. The change may be, for example, removing the graphical indicator from the graphical user interface.

Additionally, a sensor originating position information for the graphical indicator removed may occur based on removing the graphical indicator from the graphical user interface. In other words, the graphical indicator is removed from the graphical user interface in which the graphical indicator represents a sensor no longer used in identifying a position of the aircraft.

In another illustrative example, the change may shift a location of the graphical indicator to a new location. The shift may cause adjusting of a number of other graphical indicators in the graphical indicators based on the new location of the graphical indicator. A number of other graphical indicators is one or more other graphical indicators in this depicted example.

In this manner, the process illustrated in FIG. 6 may be used to manage the navigation of an aircraft. With increased accuracy in identifying the system position of an aircraft from the sensor positions, the navigation of the aircraft using a flight plan may occur more accurately. Navigation of the aircraft may be performed by at least one of the flight management system or the pilot in these illustrative examples.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
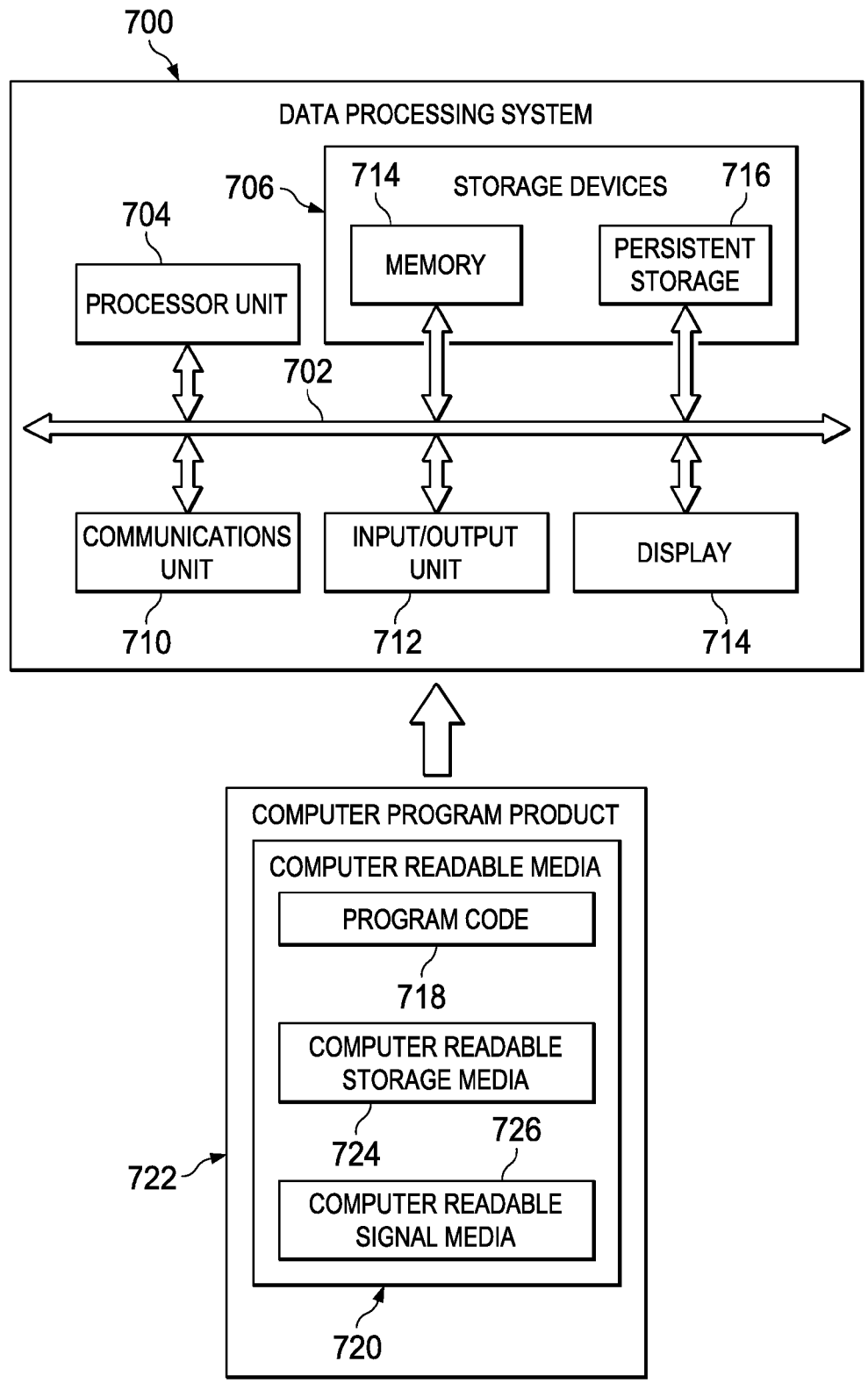
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers in computer system 204 in FIG. 2. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multi-processor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and devices. Communications unit 708 may provide communications using physical communications links, wireless communications links, or some combination thereof.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touchscreen, a laser display, a holographic display, a virtual display device, or some other type of display device.

In this illustrative example, the processes of the different illustrative embodiments may be performed by processor unit 704 using computer-implemented instructions. These instructions may be referred to as program code, computer usable program code, or computer readable program code and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718 rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be using at least one of an electromagnetic signal, an optical signal, or some other type of signal that can be transmitted over physical communications links, wireless communications links, or both.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

Thus, the illustrative embodiments provide a method and apparatus to manage navigation of the aircraft. In particular, an illustrative example identifies positions for an aircraft from position information from sensors; displays graphical indicators on a graphical user interface in a display system, wherein graphical indicators identify the positions for the aircraft; and displays range rings around the graphical indicators, wherein the ranges rings indicate ranges for the positions. The display may be used by a pilot to manage navigation of the aircraft. The display may be used to identify a situation in which the accuracy of the position identified for the aircraft from the different sensors are not as accurate as desired.

The identification can be made without the pilot or other human operator performing calculations. The graphical view provided allows the pilot to look at the positions and the ranges to determine whether one or more sensors do not have a desired level of accuracy. Further, a touchscreen device may be used to display the graphical user interface and receive user input from the pilot. The user input received through the touchscreen device may take the form of gestures or other suitable input.

Thus, a pilot or other operator may monitor the position identified for the aircraft using position information from multiple sensors in the aircraft. The pilot may remove a sensor from use in identifying the position of the aircraft when the pilot identifies that the sensor does not have a desired level of accuracy using the graphical user interface in the different illustrative examples. The graphical user interface provides a visual indication to the pilot as to whether the positions identified by the sensors and the positions for the aircraft using the position identified by the sensors have a desired level of accuracy. In the illustrative example, the graphical indicators for the positions and range rings around the graphical indicators provide the pilot with a graphical view as to whether a sensor is not performing as desired.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing navigation of an aircraft, the method comprising:
   identifying positions for the aircraft from position information from sensors;
   displaying graphical indicators on a graphical user interface in a display system, wherein the graphical indicators identify the positions for the aircraft;
   displaying range rings around the graphical indicators, wherein the range rings indicate accuracy bounds for the positions;
   changing, responsive to receiving a user input, a display location, on the graphical user interface in the display system, of a system graphical indicator for the position of the aircraft in the graphical indicators;
   identifying a position of the aircraft via identifying positions in the position information from the sensors and using a new location for the system graphical indicator as an initial position for calculations for identifying the position of the aircraft from other positions identified by the sensors; and
   removing, responsive to a graphical indicator representing a sensor no longer used in identifying the position of the aircraft, the graphical indicator from the graphical user interface.

2. The method of claim 1, wherein the step of displaying graphical indicators comprises:
   displaying the graphical indicators on the graphical user interface on a touchscreen device in the display system.

3. The method of claim 1, wherein a range ring in the range rings has a radius that indicates an area in which a position of a sensor in sensors may be found with a selected level of certainty.

4. The method of claim 3, further comprising:
   disabling a sensor originating the position information for the graphical indicator based on removing the graphical indicator from the graphical user interface.

5. The method of claim 3, wherein the changing step comprises:
   shifting a graphical indicator to the new location; and further comprising:
   adjusting a number of other graphical indicators in the graphical indicators based on the new location of the graphical indicator.

6. The method of claim 1, wherein a system graphical indicator in the graphical indicators indicates a position of the aircraft based on the positions indicated by the graphical indicators for the sensors.

7. The method of claim 1, wherein the display system is located in at least one of a flight management system or an electronic flight bag.

8. The method of claim 1, wherein the range rings indicate ranges for the positions with a selected level of certainty.

9. The method of claim 1 further comprising:
   receiving the position information from the sensors, wherein the sensors are selected from at least one of an inertial navigation unit, a global navigation satellite system receiver, a VHF omnidirectional radio range unit, distance measuring equipment, or a localizer receiver.

10. An apparatus that comprises:
    a navigation function configured to:
      identify positions for an aircraft from position information from sensors;
      display graphical indicators on a graphical user interface in a display system, such that the graphical indicators identify the positions for the aircraft;
      display range rings around the graphical indicators, such that the range rings indicate accuracy bounds for the positions;
      change, responsive to a reception of a user input, a graphical indicator in the graphical indicators displayed on the graphical user interface in the display system; and
      responsive to a disablement of a sensor that originates the position information for the graphical indicator, change the graphical indicator.

11. The apparatus of claim 10, wherein the navigation function displays the graphical indicators on the graphical user interface on a touchscreen device in the display system.

12. The apparatus of claim 11, wherein a range ring in the range rings has a radius that indicates an area in which a position of a sensor in sensors may be found with a selected level of certainty.

13. The apparatus of claim 12, further comprising:
a display of a system graphical indicator, for the position of the aircraft in the graphical indicators, on the graphical user interface in the display system, configured to change responsive to a reception of a user input; and
the navigation function configured to identify a position of the aircraft based upon the positions identified from the position information from the sensors based upon a use of a new location for the system graphical indicator as an initial position for new calculations that identify the position of the aircraft based upon the positions identified by sensors.

14. The apparatus of claim 10, wherein a system graphical indicator in the graphical indicators indicates a position of the aircraft based on the positions indicated by the graphical indicators for the sensors.

15. The apparatus of claim 10, wherein the display system is in one of a flight management system and an electronic flight bag.

16. The apparatus of claim 10, wherein the range rings indicate ranges for the positions with about a selected level of certainty.

17. An apparatus that comprises a navigation function configured to:
identify positions for an aircraft from position information from sensors;
display graphical indicators on a graphical user interface on a touchscreen device in a display system, such that the graphical indicators identify the positions for the aircraft;
display a range ring around each of the graphical indicators, respectively, such that each range ring indicates an accuracy bound for each of the graphical indicators via a radius that indicates an area in which a position of a sensor in sensors may be found with a selected level of certainty;
change, responsive to a reception of a user input, a graphical indicator in the graphical indicators displayed on the graphical user interface in the display system; and
responsive to a disablement of a sensor that originates the position information for the graphical indicator, change the graphical indicator.

18. The apparatus of claim 17, further comprising:
a display of a system graphical indicator, for the position of the aircraft in the graphical indicators, on the graphical user interface in the display system, configured to change responsive to a reception of a user input; and
the navigation function configured to identify a position of the aircraft based upon the positions identified from the position information from the sensors based upon a use of a new location for the system graphical indicator as an initial position for new calculations that identify the position of the aircraft based upon the positions identified by sensors.

19. The apparatus of claim 17, wherein a system graphical indicator in the graphical indicators indicates a position of the aircraft based on the positions indicated by the graphical indicators for the sensors.

20. The apparatus of claim 17, wherein the display system is in one of a flight management system and an electronic flight bag.

* * * * *